Oct. 13, 1936.                M. E. STECZYNSKI                2,056,986
                                  DRAFT ARM
                              Filed July 18, 1932
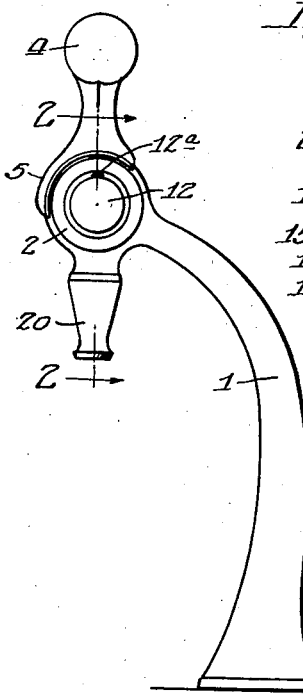
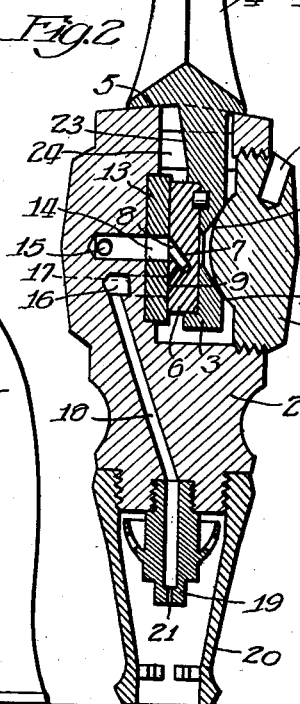
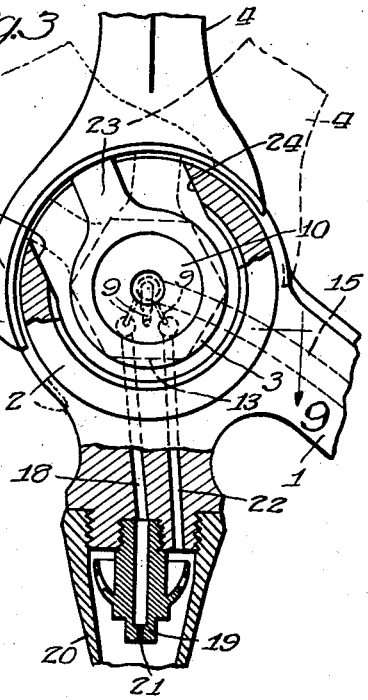
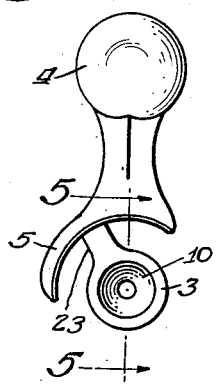
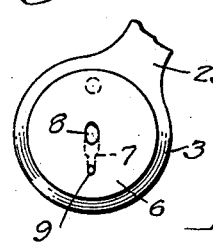
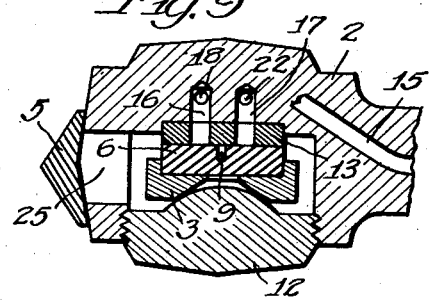
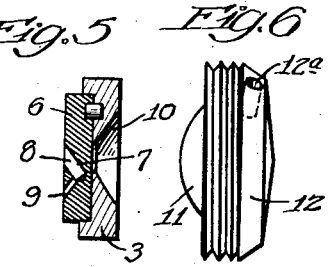
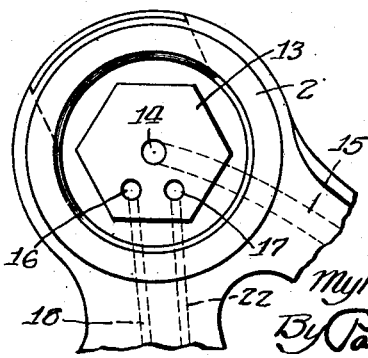
Inventor:
Myron E. Steczynski
By Parker Carr Attys.

Patented Oct. 13, 1936

2,056,986

UNITED STATES PATENT OFFICE 2,056,986

DRAFT ARM

Myron E. Steczynski, Chicago, Ill., assignor to Knight Soda Fountain Company, Chicago, Ill., a corporation of Illinois Application July 18, 1932, Serial No. 623,081

3 Claims. (Cl. 225—24)

This invention relates to draft arms and has for its object to provide a new and improved device of this description. The invention has as a further object to provide a draft arm particularly adapted for producing coarse and fine streams by an easily operated lever moving through a comparatively small arc, the lever coming to a definite rigid stop in each position, thereby making the entire operation quick acting and positive. The invention has as a further object to provide a draft arm which is simple in construction, which has comparatively few parts and which is effective and smooth in its operation. The invention has as a further object to provide a draft arm, the operating mechanism of which is easily accessible and which can be easily adjusted for wear. The invention has other objects which are more particularly pointed out in the accompanying description.

Referring now to the drawing, Fig. 1 is a view of one form of draft arm embodying the invention;

Fig. 2 is a sectional view taken on line 2—2 of Fig. 1;

Fig. 3 is a view showing the parts broken away and indicating the various positions of the handle lever during the operation of the draft arm;

Fig. 4 is a view of the handle and associated parts separate from the head;

Fig. 5 is a sectional view taken on line 5—5 of Fig. 4;

Fig. 6 is a view of the regulating side cap;

Fig. 7 is a view of the stationary controlling member in the head of the draft arm;

Fig. 8 is an enlarged view of the movable controlling member showing the face opposite to that shown in Fig. 4;

Fig. 9 is a sectional view taken on line 9—9 of Fig. 3.

Like numerals refer to like parts throughout the several figures.

Referring now to the drawing, I have shown a draft arm having the body portion 1 and the head 2. The head is hollowed out to receive the movable projecting member 3 which is attached to the handle lever 4. This handle lever has a guard 5 which covers the opening in the head through which the movable controlling member 3 is received. This guard is long enough to cover the entire opening during all positions of the handle as it is rocked back and forth.

The member 3 is provided with a movable controlling member shown as a disc 6 which is preferably inserted in a recess therein, as shown in Fig. 5. This disc is provided with a passageway 7 which has an inlet 8 and an outlet 9, the inlet being at the center of oscillation. Means is provided for rocking the member 3 about its center by moving the handle 4. This result is secured in the construction shown by providing the member 3 with a spherical or conical shaped recess 10 on the side thereof opposite that containing the disc 6 and into which is received a spherical shaped projection 11 on the regulating side cap 12 which is provided on its exterior with threads and which is inserted in an opening at the side of the head 2, the threads on the cap engaging threads in the head, as shown in Fig. 2. This cap is provided with an opening 12a into which a pin may be inserted to rotate the cap to tighten or loosen it. It will be seen that there is provided a hollow head into which the movable control device is received and that the cap 12 is a part of the hollow head, the hollow head and the cap 12 forming an enclosing casing for the control device. It will further be seen that the control device is rotatably mounted upon a part of the casing and that adjustment is secured for wear by moving a part of the casing, namely the part 12. This part of the casing has three functions. It acts as a closure for the hollow space in the casing. It acts as a pivot for the rotation of the control device, and it acts as an adjusting device for taking up the wear.

Within the hollow head is a washer 13 which forms a stationary controlling member for controlling the liquid discharged by the draft arm. This stationary controlling member has a central opening 14 which is connected with the passageway 15 in the body portion 1 of the draft arm. This stationary controlling member is also provided with openings 16 and 17. The opening 16 is connected by a passageway 18 with the fine stream discharge member 19 in the nozzle 20, which has a small discharge opening 21 arranged so that a small stream is discharged therethrough and through the nozzle 20 into the glass or other receptacle. The opening 17 is connected by a passageway 22 with the nozzle 20 and forms the coarse stream which is discharged through the nozzle 20. The discharge member 19 is removably connected in the nozzle, as shown in Fig. 3.

When the parts are in position the face of the disc 6 on the member 3 is tight against the face of the stationary controlling member 13 and the opening 8 of the disc 6 registers with the opening 14 of the stationary controlling member 13.

When the handle 4 is moved to the dotted position to the right shown in Fig. 3, it comes to a positive stop because of the fact that the connecting piece 23, which connects the member 3 with the handle, strikes the shoulder 24 on the head 2. In this position of the handle the opening 9 of the disc 6 registers with the opening 8 in the stationary controlling member 13. This connects the passageway 15 with the passageway 18 and with the fine discharge opening or nozzle 21.

When the handle 4 is moved in the opposite direction to the dotted position at the left of Figure 3, it is brought to a fixed stop position by the fact that the connecting piece 23 comes into contact with the shoulder 25 on the head 2. In this position of the handle the opening 9 of the disc 6 is connected with the opening 17 in the stationary controlling member 13 and this connects the passageway 15 with the passageway 22 and produces the discharge of the large stream of material through the nozzle 20.

When the handle 4 is moved to the central position shown in full lines, the opening 9 is between the openings 17 and 18 and the connection between the nozzle and the passageway 15 is broken so that no liquid passes out the nozzle.

The use and operation of my invention are as follows:

When the parts are in position as shown and the regulating side cap tightened, the face of the movable controlling member 6, having the openings 8 and 9, is tightly pressed against the face of the stationary controlling member 13, the openings 8 and 14 registering. When the handle 4 is moved back and forth it moves about the spherical portion 11 on the cap 12, the spherical portion acting in the nature of a pivot for this movement. This construction compensates for all mechanical misalignment of the parts and maintains uniform pressure at every element of contact surface between the disc 6 and washer 13. When the handle 4 is moved to the right, as shown in dotted lines in Fig. 3, it comes to a full rigid stop, and in this position the opening 9 registers with the opening 16 in the stationary controlling member 13, thereby connecting the passageway 15 in the body of the draft arm with the fine nozzle 21. When the arm 4 is moved to the dotted position shown on the left of Fig. 3, it comes to a fixed stop, and when in this position the opening 9 registers with the opening 22 in the stationary controlling member 13, thereby connecting the passageway 15 with the large stream nozzle. When the handle is moved to the central position the draft arm is closed so that no liquid passes through the nozzle. When the parts wear they may be easily and quickly tightened up by simply giving the regulating cap 12 a rotary movement. It will thus be seen that the parts may be easily kept in a tightened position so that there can be no leakage.

When it is desired to secure access to the interior of the head, it is only necessary to remove the cap 12, whereupon the handle 4 and the movable controlling member 3 may be removed. It will be seen, therefore, that there are no nuts or bolts or similar devices used in fastening the parts together, but that the parts are held in their proper operative position by the regulating cap 12, this cap acting as a regulating member and as a pivot connection for the handle 4 and as a fastening means for fastening the handle and associated parts in position and as a cap, the removal of which gives access to the interior of the head of the draft arm.

I claim:

1. A draft arm comprising a body portion, a hollow head, a movable controlling member in said hollow head, a handle having a projecting portion which projects into the hollow head and which is connected with said movable controlling member, a stationary controlling member in said hollow head co-operating with the movable controlling member, a removable adjustable closing portion forming a closing part of the side of said hollow head, said closing portion when in place acting to hold the movable controlling members in position and forming an adjustable device for adjusting the position of said stationary and movable controlling members to take up the wear, said removable closing portion having integral therewith an engaging part which engages the portion of the handle on the interior of said hollow head and which acts as a pivot about which the handle moves, whereby the single piece has the three functions of a closing part, a pivoting part and an adjusting part for the controlling members.

2. A draft arm comprising a body portion, a hollow head, a movable controlling member in said hollow head, a handle having a projecting portion which projects into the hollow head and which is connected with said movable controlling member, a stationary controlling member in said hollow head co-operating with the movable controlling member, a removable adjustable closing portion forming a closing part of the side of said hollow head, said closing portion when in place acting to hold the movable controlling members in position and forming an adjustable device for adjusting the position of said stationary and movable controlling members to take up the wear, said removable closing portion having integral therewith an engaging part which engages the portion of the handle on the interior of said hollow head and which acts as a pivot about which the handle moves, said engaging part having a spherical shape, the portion of the handle which projects into the hollow head being provided with a recess to receive said spherical shaped engaging part.

3. A draft arm comprising a hollow head, a stationary valve member and a movable valve member in said hollow head, said valve members having flat faces which engage and having openings which are moved into and out of register by moving one of said valve members, a removable adjustable closing portion forming a closing part of the side of said hollow head having an inwardly projecting spherical shaped part integral therewith, said movable valve member having a spherical shaped recess associated therewith into which the spherical shaped projection on the said adjustable closing portion is received, whereby mechanical mis-alignment between the contacting surfaces of the two valve members is compensated for and a uniform pressure at all points of contact between the said valve members maintained by adjusting the removable adjustable closing portion.

MYRON E. STECZYNSKI.